(12) United States Patent
Kamigama et al.

(10) Patent No.: US 7,626,811 B2
(45) Date of Patent: Dec. 1, 2009

(54) LOW PROFILE DISK DRIVE UNIT

(75) Inventors: Takehiro Kamigama, Hongkong (CN); Masahiko Fujioka, Hongkong (CN); YiuSing Ho, Hongkong (CN); Yi Wan, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 117 days.

(21) Appl. No.: 11/878,773

(22) Filed: Jul. 26, 2007

(65) Prior Publication Data

US 2008/0024973 A1 Jan. 31, 2008

(30) Foreign Application Priority Data

Jul. 28, 2006 (CN) .................... 2006 1 0109040

(51) Int. Cl.
*G06F 1/16* (2006.01)
(52) U.S. Cl. ..................... 361/679.33; 361/679.37; 360/97.02; 360/69
(58) Field of Classification Search .............. 360/97.02, 360/264.1, 69, 55; 361/679–687, 724–727
See application file for complete search history.

(56) References Cited

U.S. PATENT DOCUMENTS

| | | | | |
|---|---|---|---|---|
| 6,310,747 B1 * | 10/2001 | Emo et al. | ............... | 360/97.02 |
| 7,298,584 B1 * | 11/2007 | Yamada et al. | ........... | 360/97.02 |
| 2008/0013217 A1 * | 1/2008 | Lee | ......................... | 360/264.1 |

* cited by examiner

*Primary Examiner*—Hung V Duong
(74) *Attorney, Agent, or Firm*—Nixon & Vanderhye P.C.

(57) ABSTRACT

A low profile disk drive unit includes a disk; a HSA cooperating with the disk; a base plate comprising a bottom portion for supporting the disk and the head stack assembly thereon and a base plate sidewall extending from circumference of the bottom portion; and a top cover comprising a top portion and a top cover sidewall extending from circumference of the top portion and assembled with the base plate; wherein the top cover sidewall is thinner than the base plate sidewall, and the base plate sidewall is lower than the disk with the bottom portion as a reference datum so as to define an airflow channel between a periphery of the disk and the top cover sidewall of the top cover.

11 Claims, 9 Drawing Sheets

LOW PROFILE DISK DRIVE UNIT

FIELD OF THE INVENTION

The present invention relates to information recording disk devices and, more particularly, to a low profile disk drive unit.

BACKGROUND OF THE INVENTION

One known type of information storage device is a disk drive device that uses magnetic media to store data and a movable read/write head that is positioned over the media to selectively read from or write to the disk.

Figure 1:
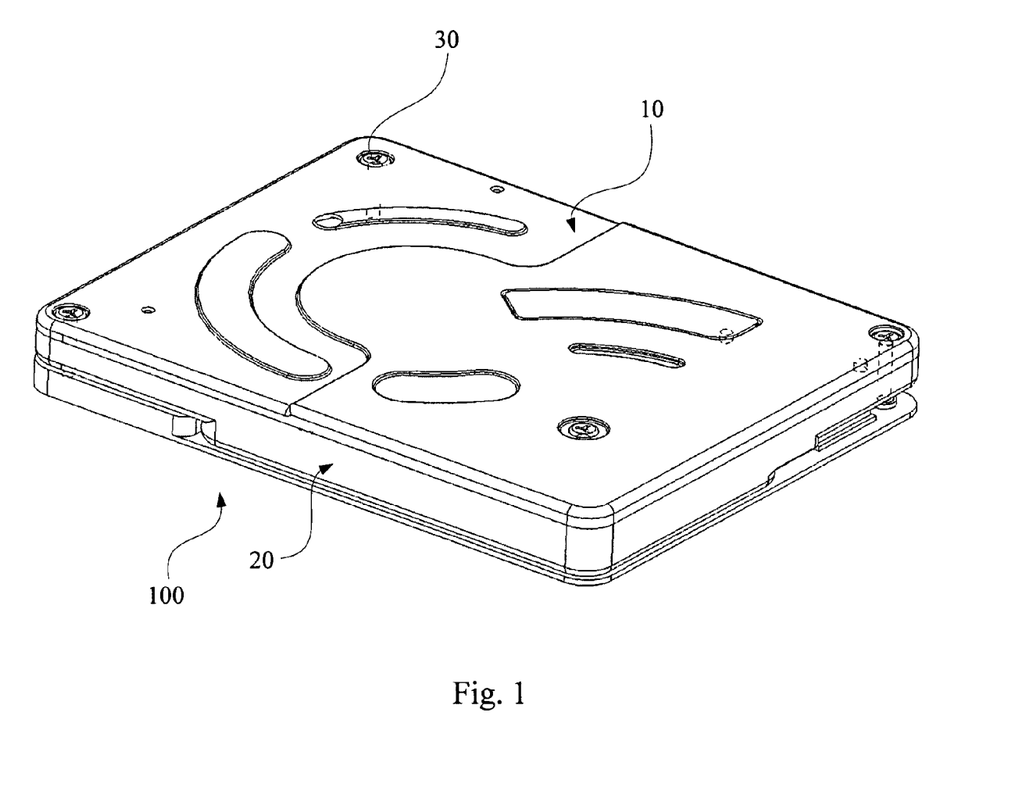
FIG. 1 is a perspective view of a conventional disk drive unit.
Figure 2:
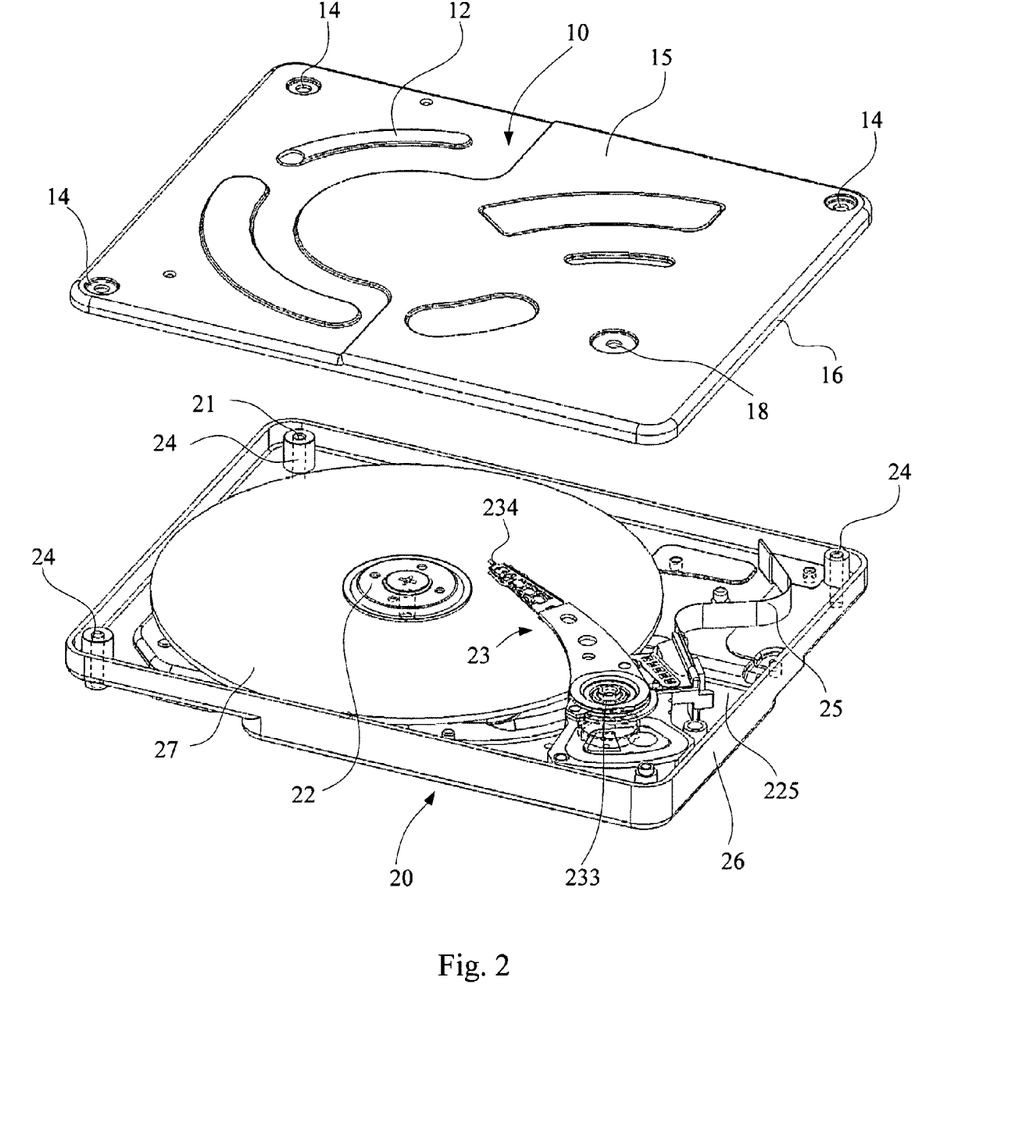
FIG. 2 is an exploded, perspective view of the disk drive unit shown in FIG. 1.
Figure 3:
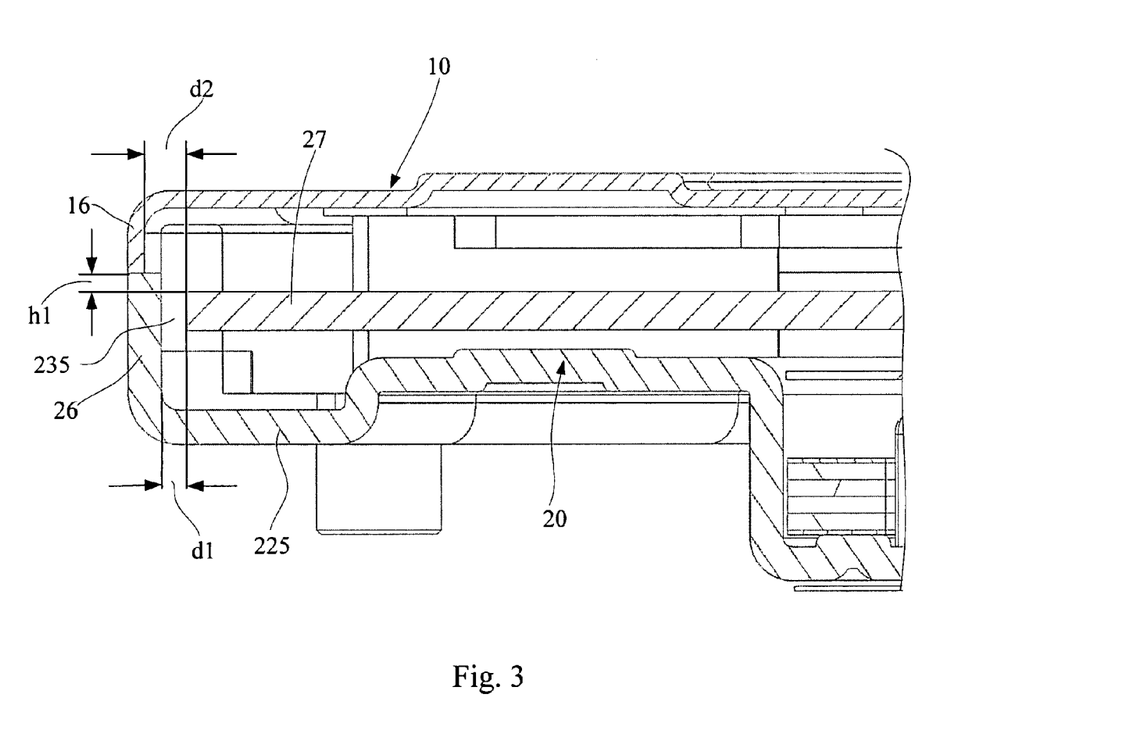
FIG. 3 is a partial cross-sectional view of the disk drive unit shown in FIG. 1.
Figure 4:
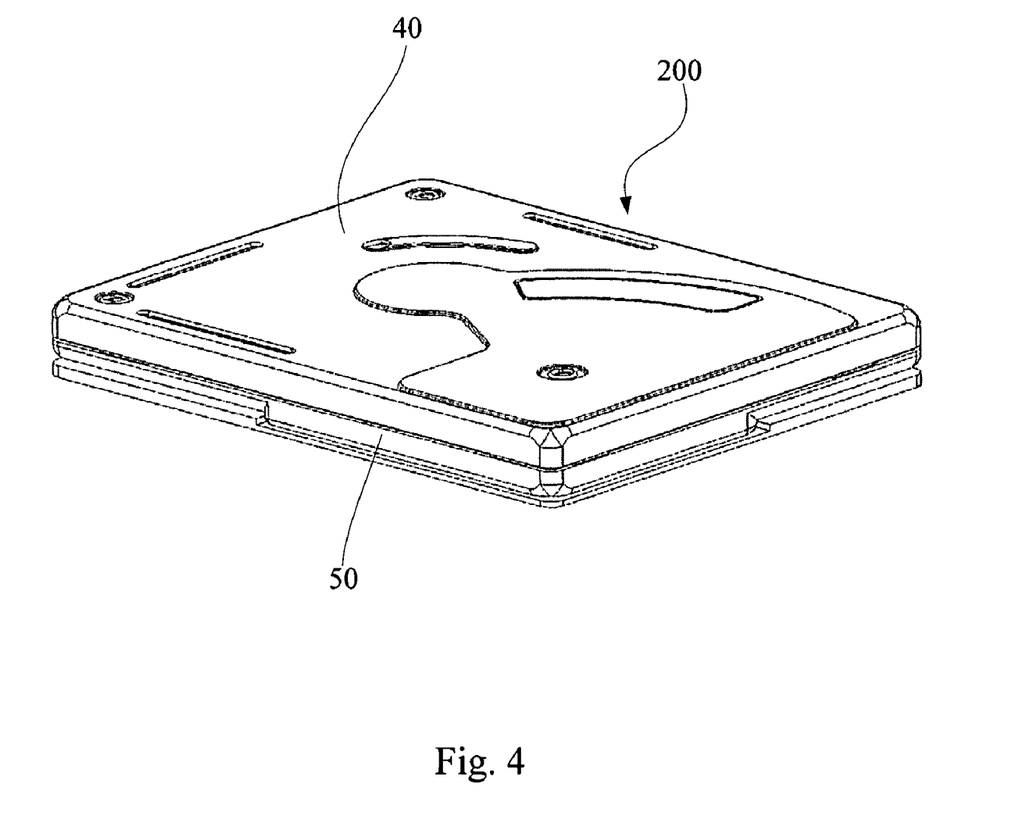
FIG. 4 is a perspective view of a disk drive unit according to an embodiment of the invention.

FIGS. 1-3 illustrate a conventional disk drive unit 100. As illustrated, the disk drive unit 100 comprises a base plate 20, a set of components (will be described hereinafter) received in the base plate 20 and a top cover 10 mounted on the base plate 20 by a plurality of screws 30. The set of components are enclosed in a space defined by the base plate 20 and the top cover 10.

As best shown in FIG. 2, the base plate 20 comprises an oblong bottom portion 225 and a sidewall 26 extending perpendicularly from a perimeter of the bottom portion 225. Four posts 24, each of which has a screw hole 21 defined therein, are formed at four corners of the base plate 20 respectively for mounting the top cover 10 on the base plate 20.

Now describe the components received in the base plate 20. Referring to FIG. 2, a disk 27 having a plurality of concentric tracks is disposed in the base plate 20 for recording digital information. The disk 27 is mounted to a spindle motor 22 and can be rotated by the spindle motor 22. Also disposed in the base plate 20 is a head stack assembly (HSA) 23 which can rotate around a bearing assembly 233. A slider 234 with a reading/writing transducer is mounted at a distal end of the HSA 23 and located above a surface of the disk 27. In addition, a flexible printed circuit (FPC) 25 is contained in the base plate 20. One end of the FPC 25 is electrically connected with the HSA 23, while the other end is electrically connected to an external control system such as a printed circuit board assembly (PCBA, not shown). In operation, the disk 27 rotates at a high speed such that an aerodynamic interaction is generated between the surface of the disk 27 and the slider 234, thus making the slider 234 flying above the disk 27 at a predefined flying height. Moreover, driven by the external control system through the FPC 25, the slider 234 can move from track to track across the surface of the disk 27 and achieve data reading/writing operation.

The top cover 10 is used to cover the components mounted in the base plate 20 and protect them from being damaged by external forces. The top cover 10 has a shape corresponding to the base plate 20, namely, an oblong shape. The top cover 10 comprises a top portion 15 and a sidewall 16 extending perpendicularly from the perimeter of the top portion 15. Several radial extrusions 12 are stampingly formed on the top portion 15 for enhancing structure rigidity. In addition, corresponding to the four posts 24 of the base plate 20, four through holes 14 are defined at four corners of the top cover 10 respectively, through which a plurality of screws 30 (see FIG. 1) can pass and be screwed to respective screw holes 21 of the posts 24, thereby securing the top cover 10 to the base plate 20. Moreover, a securing hole 18 is defined in the top portion 15 to secure the bear assembly 233 of the HSA 23 between the top cover 10 and the base plate 20.

With the development of the technology, disk drive units become smaller and smaller in size such that they can be assembled into computers of small form factor for example laptop computers, thus making computers have a smaller volume and become more convenient and portable for users. However, the conventional disk drive unit described above fails to satisfy this requirement for reduction in volume.

Commonly, for a typical disk drive unit, an airflow channel of suitable width must be formed between an inner sidewall of the disk drive unit and periphery of a disk disposed in the disk drive unit, so that when the disk rotates, sufficient airflow can be generated along surface of the disk, hence enabling a slider to be floated above the disk surface. In addition, for a typical disk drive unit, the top cover is normally thinner than the base plate for reducing whole weight of the disk drive unit. However, in a conventional disk drive unit as that shown in FIG. 3, since the sidewall 26 of the base plate 20 is designed to be higher than the disk 27 with respect to the bottom portion 225 (and in the figure, the height difference is h1), the airflow channel 235 having a width of d1 is defined between the inner side surface of the sidewall 26 and periphery of the disk 27. This width d1 is the minimum width for the airflow channel 235 and cannot be reduced any more; otherwise the airflow generated along the surface of the disk 27 will be insufficient for floating the slider above the disk surface. As a result, size of the base plate 20 cannot be reduced any more. Correspondingly, the top cover 10 mounted to the base plate 20 is also difficult to be reduced in size, and since the top cover 10 is thinner than the base plate 20, a distance d2 larger than d1 is defined between an inner side surface of the top cover 10 and the periphery of the disk 27. This distance d2 makes the top cover 10 occupy a huge space, thus causing waste in space. Resultantly, the conventional disk drive unit suffers from a big profile.

Thus, there is a need to provide an improved disk drive unit that does not suffer from the above-mentioned drawbacks.

SUMMARY OF THE INVENTION

A main object of the present invention is to provide a disk drive unit, which can effectively reduce whole profile thereof.

To achieve the above object, an aspect of the present invention is a low profile disk drive unit comprising a disk; a HSA cooperating with the disk; a base plate comprising a bottom portion for supporting the disk and the head stack assembly thereon and a base plate sidewall extending from circumference of the bottom portion; and a top cover comprising a top portion and a top cover sidewall extending from circumference of the top portion and assembled with the base plate. The top cover sidewall is thinner than the base plate sidewall, and the base plate sidewall is lower than the disk with the bottom portion as a reference datum so as to define an airflow channel between a periphery of the disk and the top cover sidewall of the top cover.

In an embodiment, at least one retaining member is formed on the base plate sidewall of the base plate and engaged with the top cover sidewall of the top cover to restrain the top cover from moving horizontally. The retaining member may have any suitable structure, for example a tab extending upwardly from an upper edge of the base plate sidewall, and the tab is thinner than the base plate sidewall so as to provide sufficient space for engaging with the top cover sidewall of the top cover.

Additionally, for enhancing stiffness of the base plate sidewall of the base plate, a strengthening member may be provided on at least one corner of the base plate and be connected with the base plate sidewall of the base plate. The strengthening member may be of a cylinder shape.

In another aspect of the present invention, a low profile disk drive unit comprises a disk; a HSA cooperating with the disk, and an enclosure comprising a first half portion and a second half portion for enclosing the disk and the HSA therein. One of the first and the second half portions is thinner than the other, and an airflow channel is defined between a periphery of the disk and an inner surface of the thinner half portion.

Since the airflow channel is defined between the periphery of the disk and the thinner top cover sidewall or the thinner half portion of the enclosure, the whole size of the disk drive unit can be reduced while not shrinking the airflow channel. So the disk drive unit of the present invention has a low profile.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate understanding of the various embodiments of this invention. In such drawings.

DETAILED DESCRIPTION OF ILLUSTRATED EMBODIMENTS

Various preferred embodiments of the instant invention will now be described with reference to the figures, wherein like reference numerals designate similar parts throughout the various views. As indicated above, the instant invention is designed to provide a low profile disk drive unit that comprises a disk; a HSA cooperating with the disk, and an enclosure enclosing the disk and the HSA therein. The enclosure comprises a first half portion, such as a base plate, and a second half portion, such as a top cover. One of the first and the second half portions is thinner than the other, and an airflow channel is defined between a periphery of the disk and an inner surface of the thinner half portion. Compared with the conventional disk drive unit whose airflow channel is defined between the periphery of the disk and the thicker base plate, the present disk drive unit can reduce its whole size while not shrinking the airflow channel. That is to say, if the airflow channel is ensured to have the same width as the prior art, the distance between the disk and the thicker half portion of the enclosure or the base plate can be designed narrower, namely, the thicker half portion or the base plate can be narrowed. So the present disk drive unit has a low profile.

FIGS. 4-8 illustrate a disk drive unit 200 according to an embodiment of the invention. As illustrated, the disk drive unit 200 comprises a base plate 50, a set of components (will be described next) received in the base plate 50 and a top cover 40 mounted on the base plate 50 by a plurality of screws (not labeled).

Figure 5:
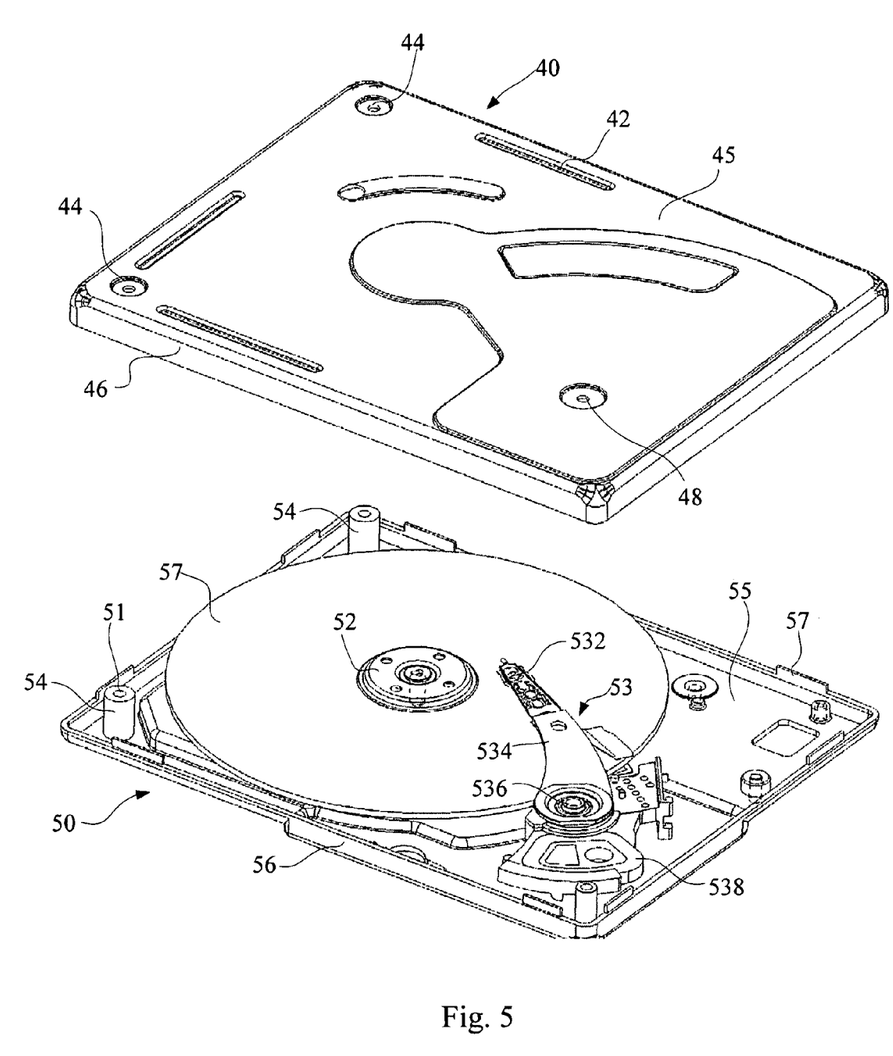
FIG. 5 is an exploded, perspective view of the disk drive unit shown in FIG. 4.
Figure 6:
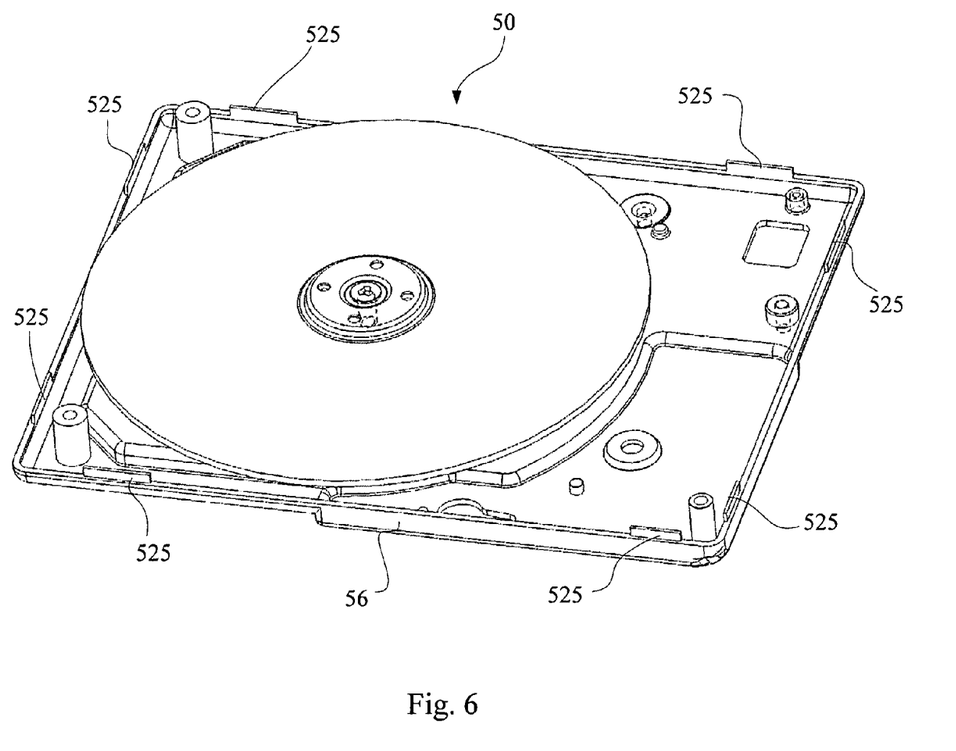
FIG. 6 is a perspective view of a base plate of the disk drive unit shown in FIGS. 4-5, also showing a disk contained in the base plate.
Figure 7:
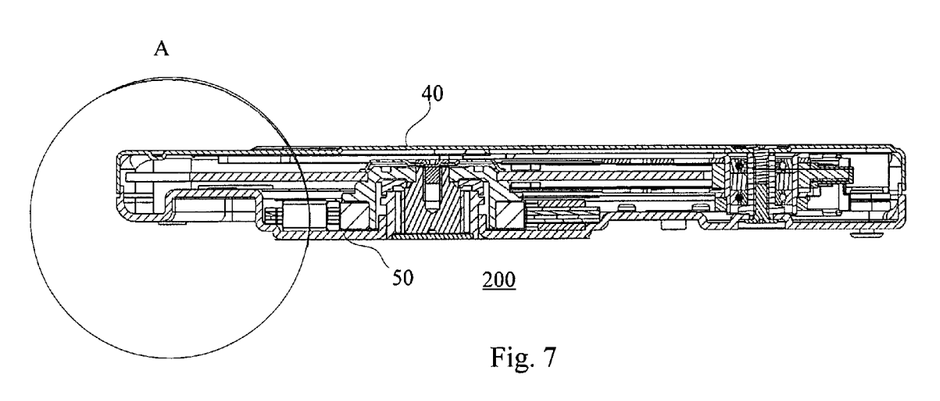
FIG. 7 is a cross-sectional view of the disk drive unit shown in FIG. 4.

As shown in FIGS. 5 and 6, the base plate 50 is mainly of a rectangular shape and comprises a bottom portion 55 and a base plate sidewall 56 formed perpendicularly upon a perimeter of the bottom portion 55. There are four posts 54 formed at four corners of the base plate 50 respectively for supporting the top cover 40. Each post 54 has a screw hole 51 defined therein for mounting the top cover 40 on the base plate 50. The base plate 50 may be made of any rigid material such as stainless steel for stably supporting the components mounted therein. In addition, the base plate sidewall 56 may be integrally formed with the bottom portion 55 by any suitable manner for example stamping process, or may be independently manufactured and then connected to the bottom portion 55 by means such as welding.

Now describe the components received in the base plate 50. Referring to FIG. 5, a disk 57 having a plurality of concentric tracks is disposed in the base plate 50 for recording digital information. The disk 57 is mounted to a spindle motor 52 and can be rotated by the spindle motor 52. Also disposed in the base plate 50 is a head stack assembly (HSA) 53. The HSA 53 comprises a bearing assembly 536 for rotating the whole HSA 53, a voice coil 538 mounted at one end of the bearing assembly 536, a drive arm 534 connected at the other end of the bearing assembly 536, and a head gimbal assembly (HGA) 532 connected to a distal end of the drive arm 534. A slider (not labeled) with a reading/writing transducer is incorporated on the HGA 532 and located above a surface of the disk 57. When in operation, the disk 57 rotates at a high speed such that an aerodynamic interaction is generated between the surface of the disk 57 and the slider, thus making the slider flying above the disk 57 at a predefined flying height. Driven by the voice coil 538, the whole HSA 53 can rotate around the bearing assembly 536, thus making the slider move from track to track along the surface of the disk 57 and achieve data reading/writing operation.

The top cover 40 is used to cover the components mounted in the base plate 50 and protect them from being damaged by external force. The top cover 40 has a shape corresponding to the base plate, namely, an oblong shape. The top cover 40 comprises a top portion 45 and a top cover sidewall 46 extending perpendicularly from the perimeter of the top portion 45. Several extrusions 42 are formed on the top portion 45 for enhancing whole structure rigidity of the top cover 40. In addition, corresponding to the four posts 54 of the base plate 50, four through holes 44 are defined at four corners of the top cover 40 respectively, through which a plurality of screws (not shown) can pass and be screwed to respective screw holes 51 of the posts 54, thereby securing the top cover 40 to the base plate 50. Moreover, a securing hole 48 is defined on the top portion 45 of the top cover 40 to secure the HSA 53 between the top cover 40 and the base plate 50. Also, the top cover 40 can be constructed by any suitable rigid material for example stainless steel for maintaining enough robustness of the top cover 40.

Figure 8:
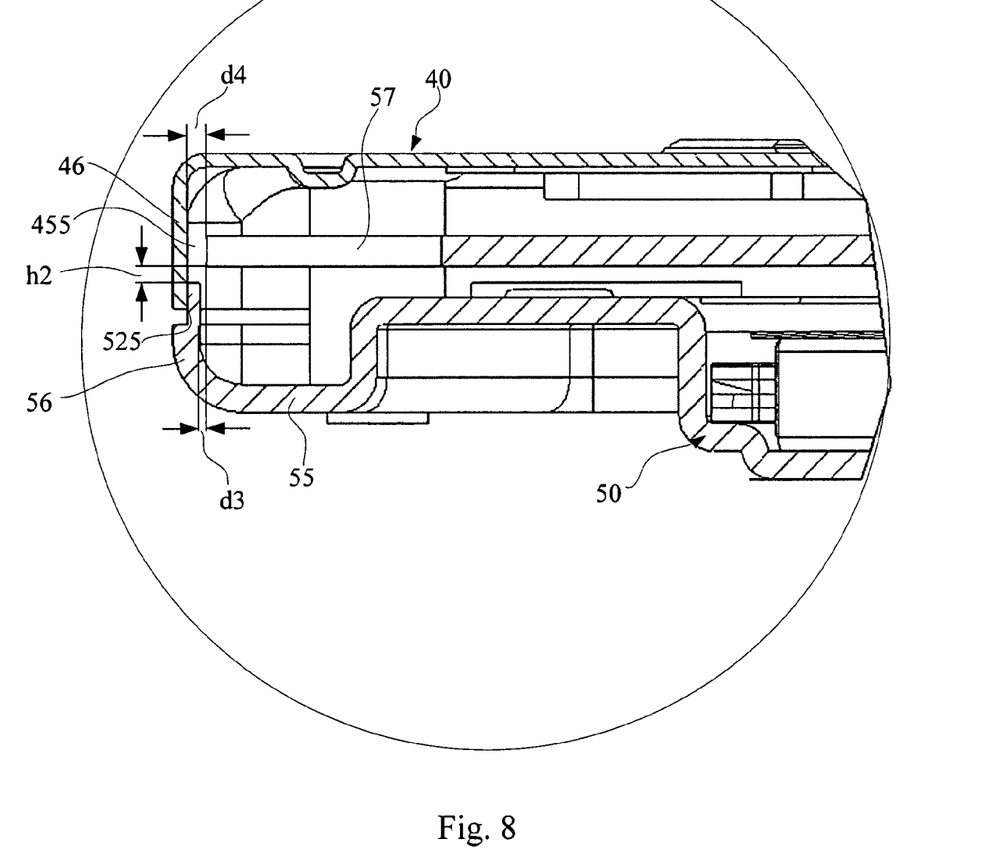
FIG. 8 is an enlarged view of portion A of the disk drive unit shown in FIG. 7.

Particularly, as shown in FIGS. 6 and 8, different from conventional disk drive unit, the base plate sidewall 56 of the base plate 50 is lower than the disk 57 with respect to the bottom portion 55, and this height difference is represented with h2; correspondingly, the top cover sidewall 46 of the top cover 40 extends downwards beyond the disk 57 and to an upper edge of the base plate sidewall 56 such that an airflow channel 455 having a width d4 is defined between the inner side surface thereof and the periphery of the disk 57. Since the airflow channel 455 is defined between the top cover sidewall 46 and the periphery of the disk 57, other than between the base plate sidewall 56 and the disk 57, and the base plate sidewall 56 is lower than the disk 57, the distance between the base plate sidewall 56 and the periphery of the disk 57 can be reduced greatly, thus making the base plate 50 have a decrease in its size, and reducing the whole volume of the disk drive unit, and thus forming a low profile disk drive unit. For example, the distance between the base plate sidewall 56 and the disk 57 may be reduced to d3, which is clearly smaller than d1 of a conventional disk drive unit (see FIG. 3).

In addition, as the top cover 40 is thinner than the base plate 50, more specifically, the top cover sidewall 46 is thinner than the base plate sidewall 56, with size reduction of the base plate 50, the distance between the top cover 40 and periphery of the disk 57 may also be reduced. For example, the distance may be reduced to d4 (the width of the airflow channel 455). Compared with the distance d2 of a conventional disk drive unit shown in FIG. 3, the distance d4 of the invention is clearly smaller than d2 but same as d1. That is, the size of the top cover 40 may also be reduced greatly such that the whole volume of the disk drive unit can also be reduced while the airflow channel 455 is not reduced.

Compared with conventional disk drive unit, since the base plate sidewall of the base plate is lower than the disk, and the airflow channel is defined between the top cover sidewall and the disk, the size of the base plate can be reduced greatly without any influence on the airflow channel; in addition, since the top cover sidewall is thinner than the base plate sidewall, the distance between the top cover sidewall of the top cover and the disk can also be reduced, therefore, reducing whole volume of the disk drive unit, and thus forming a low profile disk drive unit.

Accordingly, since both the base plate 50 and the top cover 40 are reduced in size, for avoiding the interference between the base plate 50 (top cover 40) and the components disposed in a room defined by the base plate 50 and the top cover 40, it is necessary to ensure assembly accuracy of the base plate 50 and the top cover 40. Namely, the top cover 40 should be mounted to the base plate 40 with a high positional accuracy. For achieving this purpose, as shown in FIGS. 5, 6 and 8, a plurality of retaining members such as tabs 525, for example eight restraining tabs 525 are erectly formed on the upper edge of the base plate sidewall 56. When assembling the top cover 40 to the base plate 50, the top cover sidewall 46 of the top cover 40 will be guided and restrained by these tabs 525 so that the top cover 40 with its top cover sidewall 46 will be located at proper position, and therefore, horizontal movement of the top cover 40 is prevented. More specifically, the inner side surface of the top cover sidewall 46 will be contacted against the outer side surface of the tabs 525 such that the outer side surface of the top cover sidewall 46 is aligned with that of the base plate sidewall 56 of the base plate 50. In this embodiment, the tabs 525 are thinner than the base plate sidewall 56 to facilitate alignment of the top cover sidewall 46 with the base plate sidewall 56.

Figure 9:
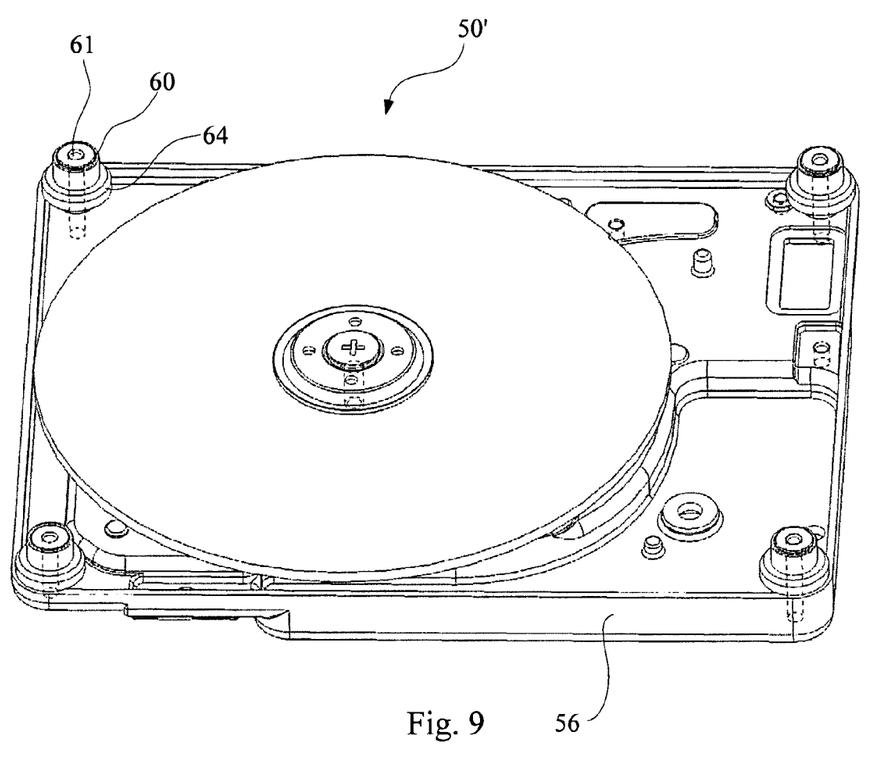
FIG. 9 is a perspective view of a base plate for the disk drive unit according to another embodiment of the invention, also showing a disk contained in the base plate.

FIG. 9 shows another embodiment of the invention. In this embodiment, four step posts 60 are formed at four corners of the base plate 50' respectively. Each step post 60 comprises a strengthening member 64 and a thinner post portion 61 extending from the strengthening member 64. The strengthening member 64 is cylinder shape and connected with the base plate sidewall 56 to enhance the stiffness of the base plate sidewall 56. The post portion 61 has a screw hole (not labeled) formed therein for mounting a top cover (not shown) to the base plate 50'.

It is noted that though in the embodiment, the base plate sidewall is lower than the disk and thicker than the top cover sidewall, and the airflow channel is defined between the disk and the top cover sidewall; however, in other embodiment, the base plate sidewall may also be higher than the disk and correspondingly thinner than the top cover sidewall, such that the airflow channel is formed between the base plate sidewall and the disk. In this alternative embodiment, similar profile reduction effect can also be achieved.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A low profile disk drive unit, comprising:
   a disk;
   a head stack assembly cooperating with the disk;
   a base plate comprising a bottom portion for supporting the disk and the head stack assembly thereon and a base plate sidewall extending from circumference of the bottom portion; and
   a top cover comprising a top portion and a top cover sidewall extending from circumference of the top portion and assembled with the base plate; wherein
   the top cover sidewall is thinner than the base plate sidewall, and the base plate sidewall is lower than the disk with the bottom portion as a reference datum so as to define an airflow channel between a periphery of the disk and the top cover sidewall of the top cover.

2. The low profile disk drive unit according to claim 1, wherein at least one retaining member is formed on the base plate sidewall of the base plate and engaged with the top cover sidewall of the top cover to restrain the top cover from moving horizontally.

3. The low profile disk drive unit according to claim 2, wherein the retaining member is a tab extending upwardly from an upper edge of the base plate sidewall and thinner than the base plate sidewall.

4. The low profile disk drive unit according to claim 1, wherein a strengthening member is provided on at least one corner of the base plate and is connected with the base plate sidewall of the base plate to enhance structural stiffness of the base plate sidewall.

5. The low profile disk drive unit according to claim 4, wherein the strengthening member is of a cylinder shape.

6. A low profile disk drive unit, comprising:
   a disk;
   a head stack assembly cooperating with the disk; and
   an enclosure comprising a first half portion and a second half portion for enclosing the disk and the head stack assembly therein; wherein
   one of the first and the second half portions is thinner than the other, and an airflow channel is defined between a periphery of the disk and an inner surface of the thinner half portion.

7. The low profile disk drive unit according to claim 6, wherein the lower half portion is a base plate having a base plate sidewall extending therefrom, the upper half portion is a top cover having a top cover sidewall extending therefrom, the top cover sidewall is thinner than the base plate sidewall, and the airflow channel is defined between the periphery of the disk and an inner surface of the top cover sidewall.

8. The low profile disk drive unit according to claim 7, wherein the base plate has at least one retaining member engaging with the top cover sidewall of the top cover to restrain the top cover from moving horizontally.

9. The low profile disk drive unit according to claim 8, wherein the retaining member is a tab extending upwardly from an upper edge of the base plate sidewall and thinner than the base plate sidewall.

10. The low profile disk drive unit according to claim 7, wherein a strengthening member is provided on at least one corner of the base plate and is connected with the base plate sidewall of the base plate to enhance structural stiffness of the base plate sidewall.

11. The low profile disk drive unit according to claim 10, wherein the strengthening member is of a cylinder shape.

* * * * *